J. H. DAVIS.
Clover and Grass Seed Sower.
No. 230,754. Patented Aug. 3, 1880.
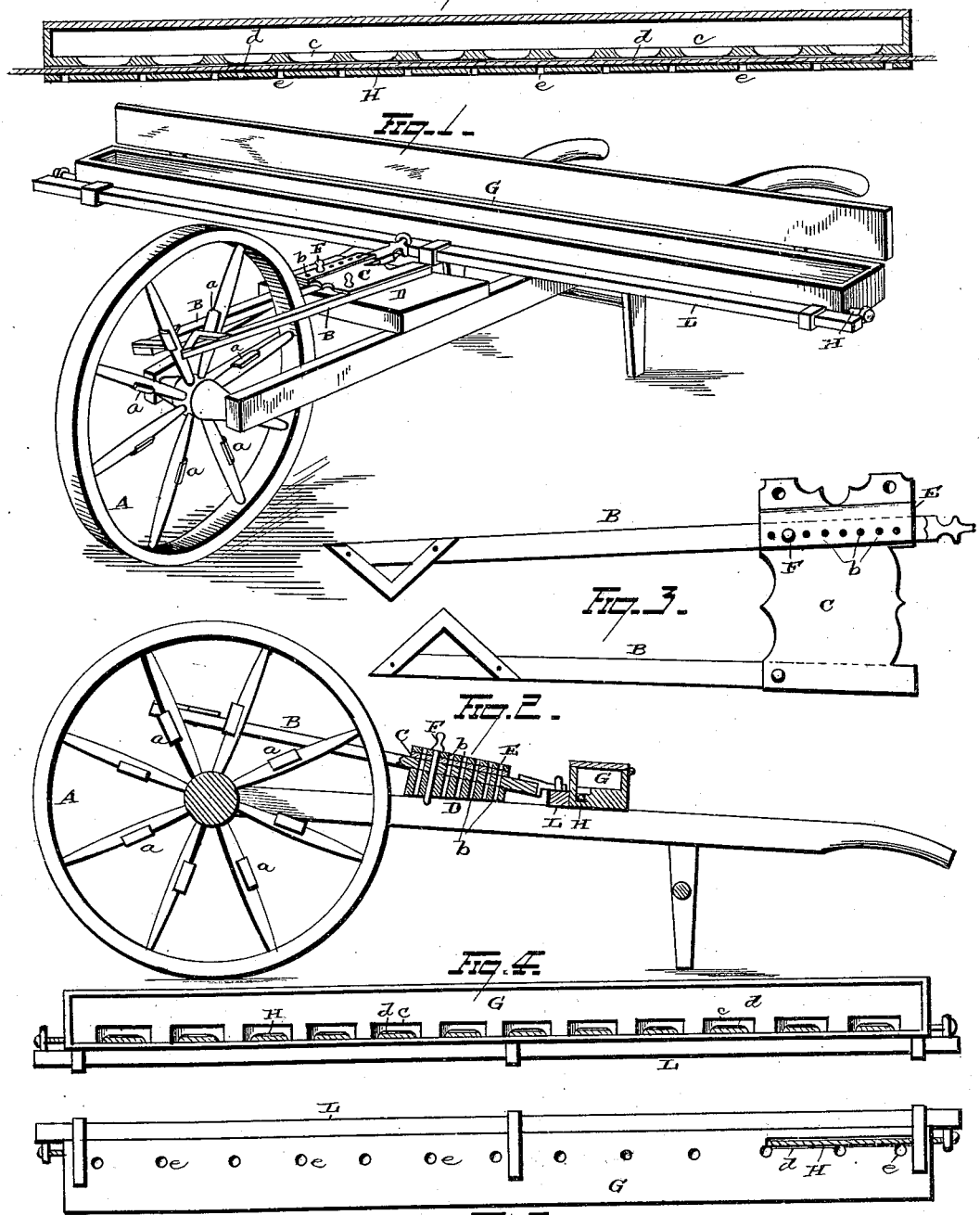
WITNESSES
E. J. Nottingham
A. W. Bright
INVENTOR
John H. Davis.
By H. A. Seymour
ATTORNEY

UNITED STATES PATENT OFFICE.

JOHN H. DAVIS, OF YPSILANTI, MICHIGAN, ASSIGNOR TO OLIVER E. THOMPSON, OF SAME PLACE.

CLOVER AND GRASS SEED SOWER.

SPECIFICATION forming part of Letters Patent No. 230,754, dated August 3, 1880.

Application filed February 3, 1880.

*To all whom it may concern:*

Be it known that I, JOHN HARVEY DAVIS, of Ypsilanti, in the county of Washtenaw and State of Michigan, have invented certain new and useful Improvements in Clover and Grass Seed Sowers; and I do hereby declare the following to be a full, clear, and exact description of the invention, such as will enable others skilled in the art to which it pertains to make and use it, reference being had to the accompanying drawings, which form part of this specification.

My invention relates to a clover and grass seed sower. Its object is to provide certain improvements whereby the sowing can be accomplished accurately and adjustably in quantities of seed sown per acre, as may be desired.

Referring to the drawings, Figure 1 is a view, in perspective, of the sower. Fig. 2 is a vertical longitudinal section of the same, taken through the long lever. Fig. 3 is a detail view of the two levers and their connecting-plate. Fig. 4 is a plan view of the interior of the seed-box. Fig. 5 is a reverse-plan view of said box, with a portion at one end broken away. Fig. 6 is a detail view, in longitudinal vertical section, through the seed-box.

The ground-wheel A has its spokes provided with metallic plates $a$ on their forward sides, so as to take the wear imposed thereon by the levers.

The two levers B are respectively located on opposite sides of the wheel, and have their forward extremities provided with V-shaped metallic projections, adapted to engage with the spoke-plates. These levers have their rear extremities secured together by a metallic plate, C, so that both levers move together. One lever has its rear extremity extended so as to engage with the reciprocating slide.

A longitudinal series of holes, $b$, are formed in the long lever, in the frame D, beneath the lever, in the metallic connecting-plate above the lever, and in an angular plate, E, whose upper horizontal portion extends over the connecting-plate. The lower horizontal portion of the angular plate is secured to the frame, and said plate serves as a support for the other connecting parts. A removable pin, F, secures said different parts together in pivotal connection.

A greater or less number of holes than those shown in the drawings may be employed, and their relative intermediate distance may be different, if desired.

The adjustment herein represented is adapted to sow from two to eight quarts per acre. When the pin is in the hole nearest the wheel eight quarts will be sowed per acre, and by removing the pin one or more holes nearer the slide a corresponding less number of quarts will be sown. The gaging is thus rendered accurate, and the exact quantity of clover or grass seed designed for a certain area of land may be evenly sown thereon.

The seed-box G has its bottom provided with an upper series of transverse semi-cylindrical feed-openings, $c$, a lower series of discharge-openings, $e$, and an intermediate longitudinal groove, $d$, which connects the upper and lower series of openings. A cord or equivalent device, H, is fitted in the longitudinal groove, and is connected at its extremities to a reciprocating bar, L, which latter is actuated by the levers. The clover or grass seed pass into the short semi-cyclindrical grooves, and are taken by the cord through the close longitudinal groove into the drop-openings. From the latter they are discharged evenly and freely in sowing.

Having fully described my invention, what I claim as new, and desire to secure by Letters Patent, is—

1. In a clover and grass seed sower, the combination, with a slide and a ground-wheel, of two independent levers, respectively located on opposite sides of the latter and having their rear extremities detachably connected together, one of said levers being adapted to be pivoted to the main frame at different distances between the wheel and slide, substantially as set forth.

2. In a clover and grass seed sower, the combination, with a slide, a ground-wheel, and two independent levers whose rear extremities are detachably connected together, of an angular projection formed on the main frame, the horizontal upper portion of said projection being provided with a longitudinal series of holes, and a pivotal pin which engages with the latter and a corresponding series of holes formed in one of the levers, substantially as set forth.

3. In a clover and grass seed sower, the combination, with a slide, a ground-wheel, and two levers whose rear extremities are pivoted together, of an angular metallic plate secured to the main frame, and beneath the horizontal upper portion of which one of the levers fits, said plate, levers, and main frame being respectively provided with a series of registering-holes and a pin which engages with same in pivoting the levers in position, substantially as set forth.

4. In a clover and grass seed sower, a seed-box whose bottom is provided with feed-openings on its upper side, discharge-openings on its lower side, and an intermediate longitudinal groove which connects said upper and lower sets of openings, in combination with a cord or equivalent device which fits closely in said intermediate groove, substantially as set forth.

5. In a clover and grass seed sower, a seed-box whose bottom is provided with feed-openings on its upper side, discharge-openings on its lower side, and an intermediate longitudinal groove which connects the upper and lower sets of openings, in combination with a cord or equivalent device which works in the intermediate groove, said lower openings being respectively located out of line with the upper openings in planes passing at right angles across the seed-box, substantially as set forth.

6. In a clover and grass seed sower, a seed-box whose bottom is provided with an upper series of transverse semi-cylindrical feed-openings, a lower series of discharge-openings, and an intermediate longitudinal groove which connects the upper and lower series of openings, in combination with a cord or equivalent device which fits closely in the intermediate groove, said lower openings being respectively located at points between each consecutive pair of upper openings in vertical transverse planes through the seed-box, substantially as set forth.

In testimony that I claim the foregoing I have hereunto set my hand and seal this 22d day of January, 1880.

JOHN H. DAVIS. [L. S.]

Witnesses:
ALBERT CUNE,
A. H. BEDELL.